Jan. 31, 1939.  E. A. RYDER  2,145,460

METHOD OF FORMING BEARINGS

Filed Nov. 28, 1936

INVENTOR.
Earle A. Ryder
BY Harris G. Luther
ATTORNEY

Patented Jan. 31, 1939

2,145,460

UNITED STATES PATENT OFFICE 2,145,460

METHOD OF FORMING BEARINGS

Earle A. Ryder, West Hartford, Conn., assignor to United Aircraft Corporation, East Hartford, Conn., a corporation of Delaware Application November 28, 1936, Serial No. 113,210

4 Claims. (Cl. 29—149.5)

This invention relates to improvements in methods of forming bearings and has particular reference to an improved method of applying bearing material to a portion of a machine element such as a journal, or a journal supporting structure.

An object of the invention resides in an improved method for applying bearing material directly to the surface of a machine element such as the journal portion of a rotatable shaft or the portion of the machine frame, base or casing, or an element supported thereby, in which the shaft journal is rotatably supported.

A further object resides in the provision of an improved method of applying a reinforced bearing structure to a machine element such as described above.

Other objects and advantages will be more particularly pointed out hereinafter, or will become apparent as the description proceeds.

In the accompanying drawing there is illustrated one satisfactory manner in which the improved method of this invention may be practically applied. It is to be understood, however, that the drawing is for the purpose of illustration only and is not to be taken as limiting the invention, the scope of which is to be measured entirely by the scope of the appended claims.

Figure 1:
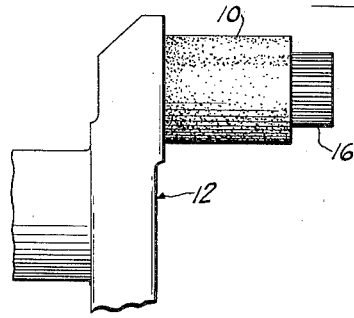
Fig. 1 is an elevational view of a machine element having a journal portion to which a bearing may be applied by the improved process of this invention, and shows one of the primary steps in the process.

In the now preferred form of applying the improved process the supporting structure that is to receive the bearing material, such as the member in which a journal is rotatably mounted, or the journal itself, as illustrated in the accompanying drawing, is first roughened by a suitable chemical or mechanical action upon its surface. It is to be understood, however, that a smooth finished, polished, or plated surface may be used to receive the bearing material. In any case the bearing material receiving surface should be of such character that a bond is formed between it and the bearing material, to hold the completed bearing in position and prevent relative rotation of the bearing and the surface on which it is formed. In the method illustrated in Fig. 1, the surface of the journal portion 10 of the shaft, generally indicated at 12, has been roughened by sand blasting.

Figure 2:
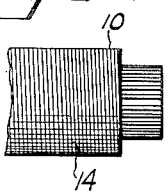
Fig. 2 is an elevational view of a fragmentary portion of the journal portion of the machine element illustrated in Fig. 1, and shows an alternative method of accomplishing the same primary step in the process.

In the alternative form illustrated in Fig. 2 the journal portion 10 has its surface roughened by means of a suitable machine operation to provide fine grooves or screw threads 14 in the surface of the journal.

The surface could likewise be roughened by etching or by other suitable means.

It is possible that the journal portions of a shaft or the journal receiving portion of a machine bed or casing, may have a contiguous portion, such as the dowel portion 16 provided to receive a complementary portion 18 of the shaft, on which it is desired not to apply bearing material. In such a case one step of the improved process is to apply a covering member such as the cap 20 illustrated in Fig. 3 to the portion which it is desired to keep free of bearing material.

Figure 3:
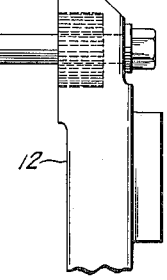
Fig. 3 is an elevational view of a machine element having a journal portion similar to that illustrated in Fig. 1 and shows an intermediate step in the improved bearing forming process.
Figure 3:
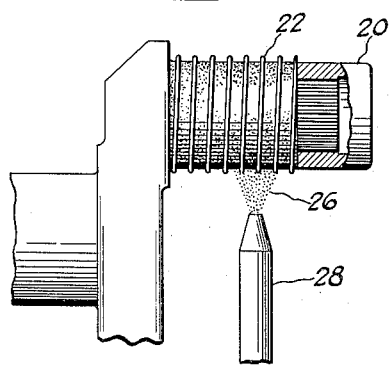
Figure 4:
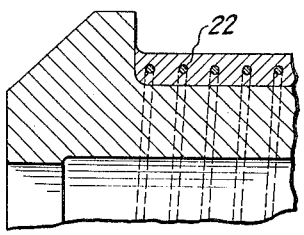
Fig. 4 is a sectional view of a fragmentary portion of a machine element and journal portion thereof and illustrates the completed bearing structure formed by the improved process of this invention.
Figure 5:
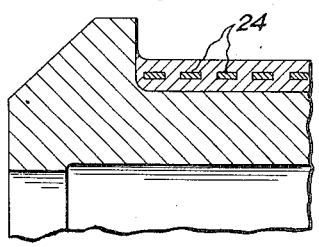
Fig. 5 is a view similar to Fig. 4 showing an alternative form of reinforcing structure of the bearing construction formed by the improved process of this invention.
Figure 6:
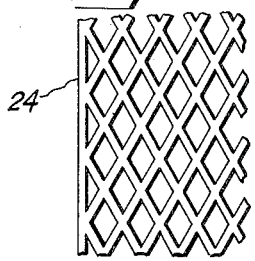
Fig. 6 is a plan view of a fragmentary portion of the reinforcing structure used in forming the bearing illustrated in Fig. 5.

With the surface that is to receive the bearing material suitably roughened and all adjacent portions of the machine elements which it is desired to preserve free of bearing material suitably covered, a suitable reinforcing structure is applied to the bearing material receiving surface of the machine elements. Two exemplary forms of reinforcing structures are illustrated in the accompanying drawing. In Figs. 3 and 4 the reinforcing member 22 takes the form of a helically wound wire member constructed of a wire having a relatively small diameter and a high tensile strength. The reinforcing structure 24 illustrated in Figs. 5 and 6 takes the form of a metal grid formed into a perforate cylindrical member which may be inserted over the journal or into the journal receiving supporting member. The material of which these reinforcing structures are made preferably has a heat expansion coefficient such that, when the reinforcing structure is applied to a journal the structure will expand slightly less than the journal upon an increase in the temperature of the machine element carrying the bearings and when the reinforcing structure is applied to a journal receiving element, it may have a heat expansion coefficient slightly greater than that of the material of which the journal receiving element is formed so that upon an increase in the temperature of the element the reinforcing structure will tend to expand to a slightly greater extent than the machine element within which it is disposed. In both cases it is desirable that the reinforcing structure should at all times tend to clamp the bearing material upon the bearing receiving surface by the exertion of pressure upon the bearing material and should not at any time exert a pressure tending to separate the bearing material from the surface to which the bearing material is applied.

While two exemplary forms of reinforcing structures have been illustrated, it is to be understood that the invention is in no way limited to the use of the forms illustrated in the drawing and described above, but that any other suitable forms of reinforcing structures may be utilized.

After the reinforcing structure has been applied to the roughened bearing receiving surface, molten bearing material, as indicated at 26, is sprayed upon the roughened surface until it completely covers the reinforcing structure. The molten bearing material is applied to the surface by a suitable spray nozzle such as is schematically illustrated at 28. Several suitable forms of spray nozzles for handling molten material are well known to the art and a description of such a nozzle is not believed necessary for the purpose of this disclosure.

While the molten bearing material is being sprayed upon the surface of the bearing supporting structure, the temperature of the structure may be maintained at the highest degree possible without endangering the heat treatment effect which has been previously provided in the journal member, or the journal receiving member.

After the bearing material has cooled upon the bearing receiving surface and has firmly adhered thereto, the bearing structure may be subjected to a suitable machining operation to provide the bearing with the proper dimensions and surface finish.

A number of metals may be used for the bearing material. A mixture of copper and lead, or pure silver, have been found to be very satisfactory but the invention is not limited to the selection of any particular metal.

While one suitable manner in which the approved method may be practically applied has been illustrated and described, it is to be understood that the method is not limited to the particular manner of application so illustrated and described but that such changes in the various steps and in the order of the steps may be resorted to as come within the scope of the subjoined claims.

Having now described the invention so that others skilled in the art may clearly understand the same, what is claimed and what it is desired to secure by Letters Patent is as follows:

1. The method of forming bearings which comprises, applying a reinforcing structure over the surface of a portion of a machine element to which bearing material is to be applied, spraying molten bearing material upon said surface until said reinforcing structure is completely included within the body of bearing material, and subjecting said bearing material to mechanical operations to reduce the same to required dimensions and surface finish.

2. The method of forming bearings which comprises, roughening the bearing receiving surface of the machine element to which the bearing is to be applied, applying a reinforcing structure over said surface, spraying molten bearing material upon said surface until said reinforcing structure is completely covered, and machining said bearing material to specified dimensions and surface finish.

3. The method of forming bearings which comprises, applying to the bearing receiving portion of the machine element a reinforcing structure having a heat expansion coefficient different from the heat expansion coefficient of the machine element upon which the bearing is to be formed, spraying molten bearing material upon said bearing receiving portion until said reinforcing structure is completely included within the body of bearing material, and subjecting said bearing material to mechanical operations to reduce the same to the required dimensions and surface finish.

4. The method of forming bearings which comprises, roughening the bearing receiving surface of the machine element to which the bearing is to be applied, applying a reinforcing structure having a heat expansion coefficient such that said reinforcing structure will increase the pressure between the bearing material and the bearing receiving surface of the machine element upon a rise in temperature, spraying molten bearing material upon said surface until said reinforcing structure is completely covered, and machining said bearing material to specified dimensions and surface finish.

EARLE A. RYDER.